United States Patent [19]
Peterson

[11] Patent Number: 5,931,247
[45] Date of Patent: Aug. 3, 1999

[54] FOREST HARVESTER METHODS AND APPARATUS

[76] Inventor: Robin A. Peterson, W5634 Evergreen #3 Rd., Menominee, Mich. 49858

[21] Appl. No.: 08/978,680

[22] Filed: Nov. 26, 1997

[51] Int. Cl.$^6$ .................................................. B62D 33/063
[52] U.S. Cl. ........................ 180/89.13; 144/335; 414/680
[58] Field of Search ........................... 180/89.12, 89.13; 296/190.01, 190.08; 144/335; 414/680, 686, 729, 739

[56] References Cited

U.S. PATENT DOCUMENTS

| | | | |
|---|---|---|---|
| 3,238,981 | 3/1966 | Larson et al. | 144/309 |
| 3,618,647 | 11/1971 | Stuart, Jr. | 144/309 |
| 4,034,876 | 7/1977 | Yancey | 214/152 |
| 4,067,369 | 1/1978 | Harmon | 144/34 R |
| 4,365,927 | 12/1982 | Schenck | 414/729 |
| 4,540,032 | 9/1985 | Pelletier et al. | 144/3 D |
| 4,565,486 | 1/1986 | Crawford | 414/729 |
| 4,571,147 | 2/1986 | Schaeff | 414/694 |
| 4,579,157 | 4/1986 | Lindblom | 144/3 D |
| 4,583,908 | 4/1986 | Crawford | 414/694 |
| 4,907,667 | 3/1990 | Yamamoto et al. | 180/89.13 |
| 4,984,961 | 1/1991 | Herolf | 414/786 |
| 5,107,912 | 4/1992 | Cote et al. | 144/138 |
| 5,553,993 | 9/1996 | Gilbert et al. | 414/739 |
| 5,595,225 | 1/1997 | Gilbert et al. | 414/34.1 |

*Primary Examiner*—Paul N. Dickson
*Attorney, Agent, or Firm*—Mau & Krull, P.A.

[57] ABSTRACT

A forester harvester has a house frame mounted on a base assembly and rotatable relative thereto about an axis of rotation. A boom is mounted on the house frame at a location radially offset from the axis of rotation. A cab is mounted on the house frame adjacent the boom and as forward as possible without protruding beyond the tail swing circumference of the house frame. A motor is mounted on the house frame rearward of the boom and the cab.

22 Claims, 3 Drawing Sheets

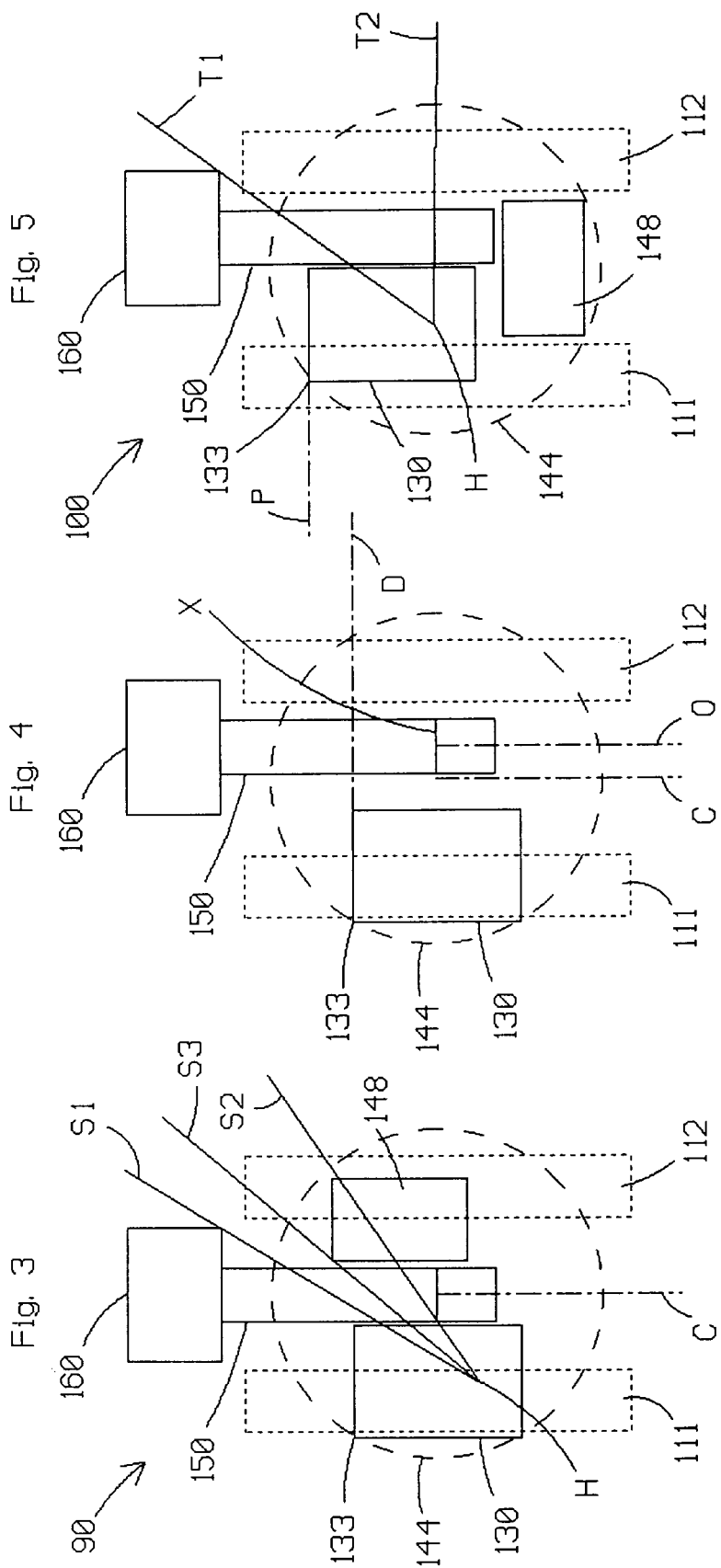

FOREST HARVESTER METHODS AND APPARATUS

FIELD OF THE INVENTION

The present invention relates to methods and apparatus for maneuvering a vehicle through a forest and harvesting select trees within the forest.

BACKGROUND OF THE INVENTION

Recognized as a valuable resources forests are the source of constant tension between ecological concerns and ongoing needs for timber and other wood products. As a result, forest management is a serious business, and methods are practiced to conserve existing forests, improve harvesting methods, and provide for future harvesting needs. One such method involves thinning of an existing forest. The objective of thinning is to remove some trees while causing minimal damage to the surrounding environments including the underlying earth and the neighboring trees. Improvements that decrease ecological damage and/or increase production serve the interests of both the tree-hugger and the tree-cutter.

SUMMARY OF THE INVENTION

The present invention provides an improved forest harvester which is sized and configured to maneuver through a forest and harvest select trees. Additional features and/or advantages of the present invention may become more apparent from the detailed description which follows.

BRIEF DESCRIPTION OF THE DRAWINGS

With reference to the Figures of the Drawings wherein like numerals represent like parts and assemblies throughout the several views.

FIG. 3 is a diagrammatic top view of a prior art forest harvester;

FIG. 4 is a diagrammatic top view of an innovative modification to the prior art forest harvester of FIG. 3; and FIG. 5 is a diagrammatic top view of an innovative modification to the modified forest harvester of FIG. 4.

DETAILED DESCRIPTION OF THE PREFERRED EMBODIMENT

Figure 1:
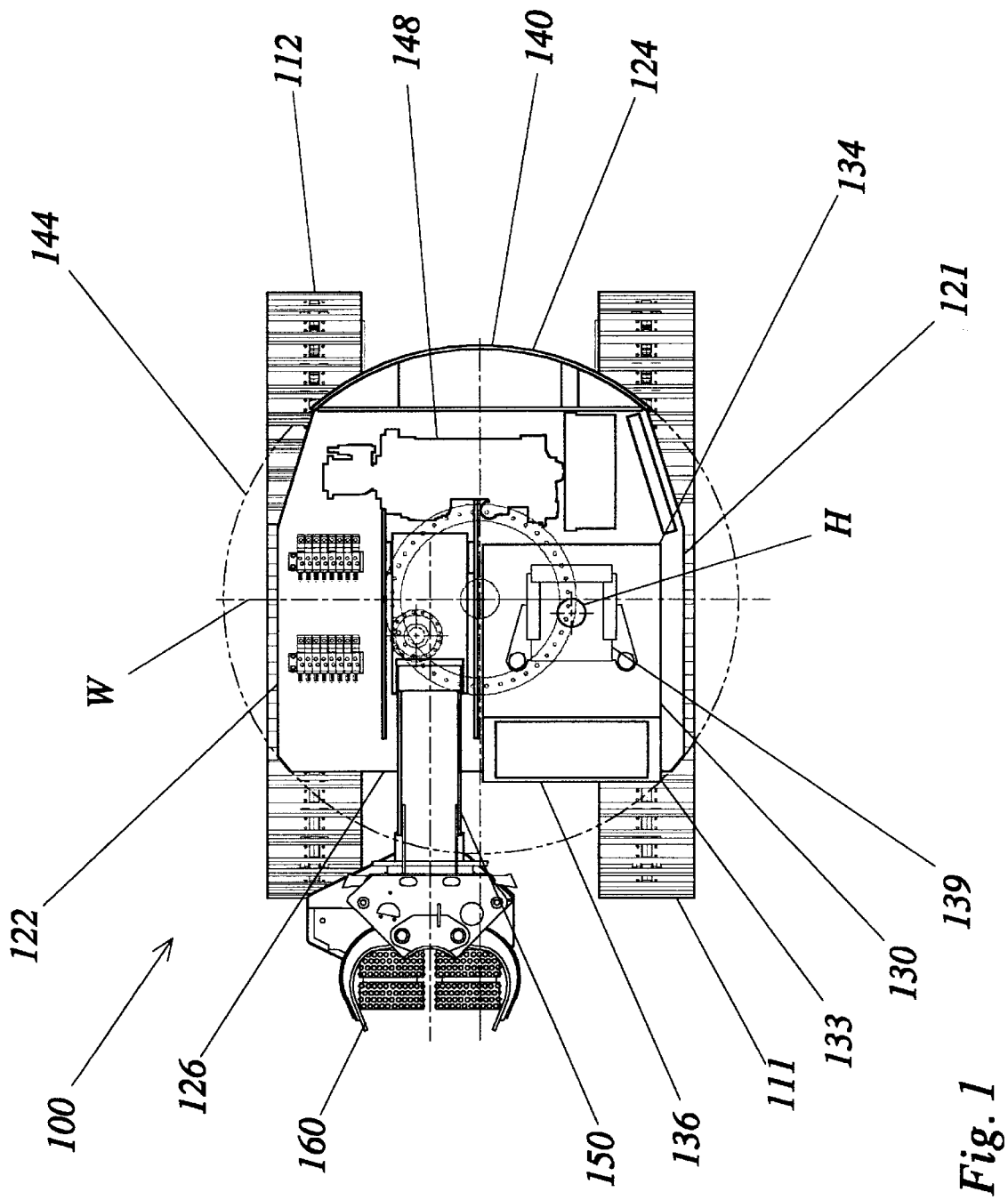
FIG. 1 is a top view of a forest harvester constructed according to the principles of the present invention (with some hidden lines shown)

The present invention involves a reorganization of tree harvester assemblies or components in order to improve visibility for an operator of the harvester Such reorganization may involve reconfiguration of one or more such assemblies or components as well. However, in order to fairly illustrate the advantages of the present invention (by means of an "apples to apples" comparison) the following description references assemblies and components of like size and shape on both a prior art harvester designated as 90 in FIG. 3 and a harvester constructed according to the principles of the present invention and designated as 100 in FIGS. 1–2 and 5.

The harvester 100 generally includes a ground engaging base 110, a house frame or upper frame 120, and a boom or harvesting arm 150. The ground engaging base 110 includes continuous or looped treads 111 and 112 which are operable to traverse a ground surface 99 in a manner known in the art.

The length of the base 110, as measured parallel to the treads 111 and 112, is approximately twelve feet on the preferred embodiment. The width of the base 110, as measured perpendicular to the treads 111 and 112, is approximately eight and one-half feet on the preferred embodiment. The treads 111 and 112 constitute a relatively reliable and environmentally friendly way to traverse the floor of a forests. As compared to wheels, the treads 111 and 112 are less vulnerable on uneven ground and better distribute the weight of the harvester 100, particularly when supported on a mat of limbs and brush.

Figure 2:
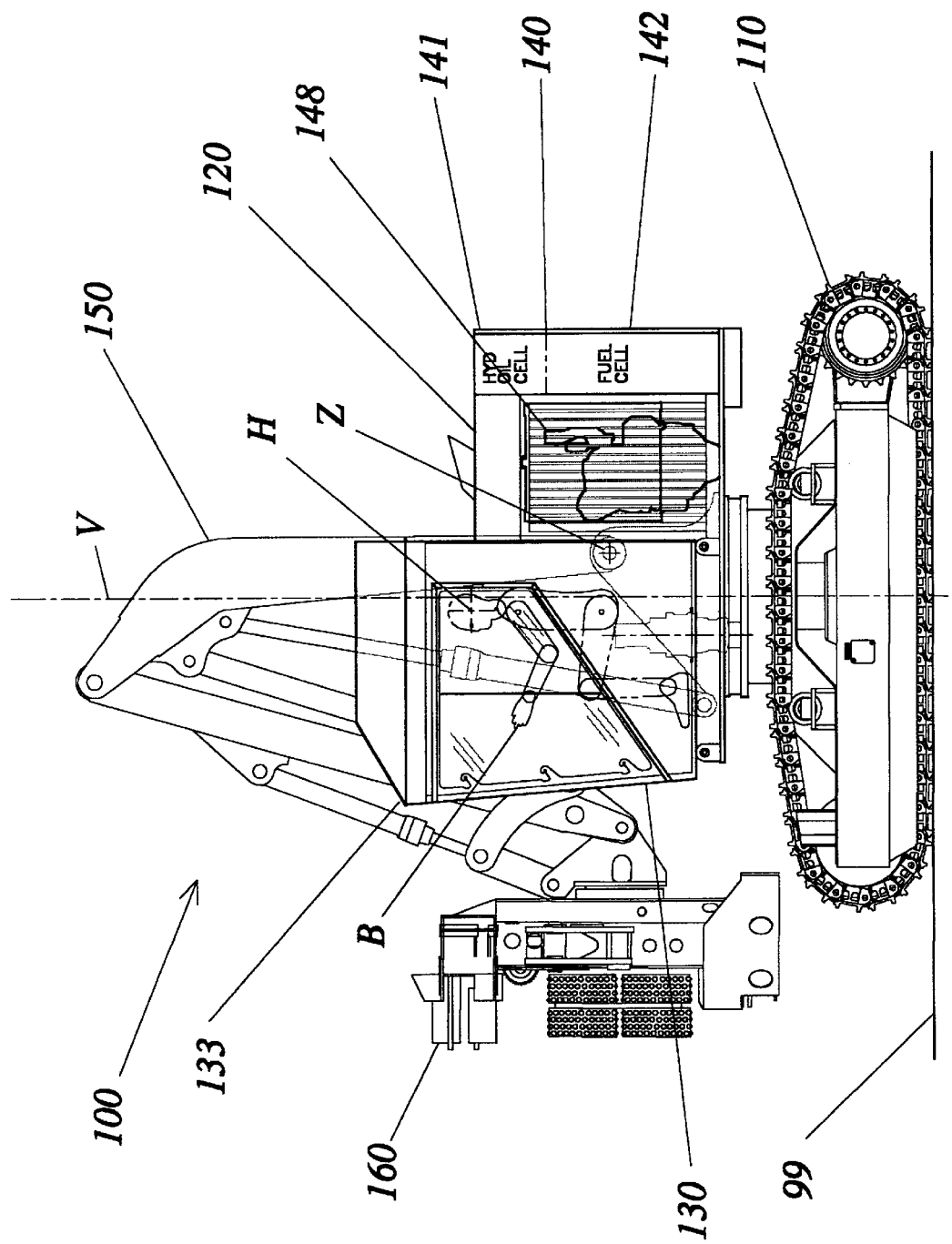
FIG. 2 is a side view of the forest harvester of FIG. 1 (with some hidden lines shown)

As shown in FIG. 2, the house frame 120 rotates about a vertical axis V relative to the ground engaging base 110, and the boom 150 pivots about a horizontal axis Z relative to the house frame 120. The horizontal axis Z is disposed rearward of the vertical axis V. The boom 150 supports a harvesting head or tool 160 which is operable to cut trees in a manner known in the art.

The house frame 120 extends laterally (parallel to the line W in FIG. 1) between a left side 121 and a right side 122, and longitudinally (perpendicular to the line W in FIG. 1) between a rear end 124 and a front end 126. In addition to supporting the boom 150, the house frame 120 generally includes a cab 130 and a tail portion 140. The rear end 124 of the house frame 120, which coincides with the rear end of the tail portion 140, defines a radially outermost portion of the upper frame 120 (relative to axis V). When the house frame 120 rotates relative to the base 110 about axis V, the rear end 124 defines a tail swing circumference or maximum acceptable circumference 144 at a radius of approximately five feet from the axis V.

The tail portion 140 includes tanks 141 and 142 for storing hydraulic fluid and fuel, respectively. The tail portion 140 is made of 2" plate steel and functions as a counterweight to the boom 150 and tool 160. The rear wall of the tail portion 140 is curved to coincide with the maximum acceptable circumference 144. A motor 148 is mounted on the house frame 120, forward of the tanks 141 and 142 and rearward of the cab 130 and the boom 150.

The cab 130 provides an enclosure sized and configured to accommodate a person B and the controls needed to operate the apparatus 100. The front wall 136 of the cab 130 is upwardly and forwardly inclined relative to the ground surface 99. The outside edge of the front wall 136 is disposed at the maximum acceptable circumference 144 relative to the vertical axis V. A seat 139 is provided in the cab 130 and disposed forward of the horizontal axis Z. When the person B sits on the seat 139, he is intersected by a plane containing lateral line W and vertical axis V, and the center of his head occupies a position H.

Significant portions of the front and side walls of the cab 130 are transparent to allow the person B to see to the front and each side of the apparatus 100. The ability to see to the right side of the apparatus 100 (toward the tread 112) is one advantage of the present invention vis-a-vis the prior art and is discussed in greater detail below.

FIG. 3 shows what a prior art harvester 90 might look like if provided with components of similar size and shape and disposed within the same maximum acceptable circumference as the preferred embodiment 100 of the present invention. In particular, the boom 150 is centered relative to the center line C (and the treads 111 and 112), and the cab 130 is forced to occupy the position shown (with corner 133 just inside the circumference 144), and the motor 148 is forced to occupy the position shown (to the right of the boom 150). The boom 150 is shown in a configuration extending vertically upward to an intermediate pivot point, and then forward and downward to the tool 160. In FIG. 4, the line X indicates the forward edge of the vertical portion of the boom 150. From the perspective or vantage point H of a person seated in the cab 130, the lines S1 and S2 indicate the limits or boundaries of vision to the right of the tool 160 (at an elevation greater than that of the motor 148), and the lines S1 and S3 indicate the limits or boundaries of vision to the right of the tool 160 (at the elevation of the motor 148 and below).

FIG. 4 shows a modification to the harvester 90. In particular, the boom 150 is offset one foot to the right of the center line C (toward the right tread 112), as measured between the lines C and O. The resulting gap between the boom 150 and the cab 130 allows the latter to move to the right and forward to the position shown with reference to the preferred embodiment 100 in FIG. 5 (with the corner 133 just inside the circumference 144). The lateral offset is one foot (the same as the boom 150), and the forward movement is measured between the lines D and P, where the former indicates the location of the forward wall of the cab 130 on the prior art apparatus 90, and the latter indicates the location of the forward wall of the cab 130 on the preferred embodiment 100. The forward movement of the cab 130 allows the motor 148 to be relocated on the tail portion 140 of the frame 120 and thereby contributes to counterweight or offset the weight of the boom 150 and tool 160.

From the same relative vantage point H inside the cab 130, a person's range of vision to the right (at any elevation due to the relocation of the engine 148) is bounded by lines T1 and T2 (the latter generally coinciding with the boom edge X). In other words, a person seated in the preferred embodiment 100, has greater visibility and can see directly to the right side of the apparatus 100. As a result of this arrangement of components, an operator of the harvester 100 can see more of his surroundings and more capably and carefully maneuver the apparatus 100 in and about a forest.

The present invention has been described with reference to a preferred embodiment and a particular application. Recognizing that the foregoing description will allow those skilled in the art to recognize additional embodiments and applications, the scope of the present invention should be construed to include all such variations.

What is claimed is:

1. A forest harvester, comprising:
    a base having ground engaging treads;
    an upper frame having a front end and a rear end, wherein the upper frame is approximately centered relative to the base and rotates about a vertical axis relative to the base, and a radially outermost portion of the upper frame defines a maximum acceptable circumference about the vertical axis;
    a boom movably mounted on the upper frame at a position within the circumference, radially displaced from the vertical axis, both behind the vertical axis and toward one side of the upper frame;
    a boom counterweight mounted on the upper frame at a position within the circumference and behind the boom; and
    a cab mounted on the upper frame between the boom and an opposite side of the upper frame, and as far forward as possible without interfering with the boom and without protruding beyond the circumference.

2. The forest harvester of claim 1, wherein the boom is pivotally mounted on the upper frame and pivots relative thereto about a horizontal axis.

3. The forest harvester of claim 2, wherein the horizontal axis is rearward of the vertical axis and forward of an operator's seat disposed inside the cab.

4. The forest harvester of claim 1, wherein an operator's seat is disposed inside the cab and is intersected by a plane which contains the vertical axis and extends perpendicular to the one side of the upper frame.

5. The forest harvester of claim 1, wherein the boom counterweight is disposed as far rearward as possible without protruding beyond the circumference and is curved in a manner that coincides with the circumference.

6. The forest harvester of claim 1, wherein at least one storage tank is mounted on the rear end of the upper frame, and has a wall which is curved to coincide with the circumference.

7. The forest harvester of claim 6, wherein the storage tank has walls made of steel plates which constitute the boom counterweight.

8. The forest harvester of claim 1, further comprising a motor mounted on the upper frame and disposed rearward of the cab and the boom and forward of the boom counterweight.

9. A method of making a forest harvester, comprising the steps of:
    providing a base assembly to move across a ground surface;
    providing an upper frame having a front end, a rear end, a first side, and a second, opposite side;
    rotatably mounting the upper frame on the base assembly, so that the upper frame is approximately centered relative to the base assembly, and the upper frame rotates about a vertical axis relative to the base assembly, and a radially outermost portion of the upper frame defines a maximum acceptable circumference about the vertical axis;
    mounting a boom on the upper frame at a position behind the vertical axis and between the first side;
    mounting a cab on the upper frame at a position between the boom and the second side and as far forward as possible without interfering with the boom and without protruding beyond the circumference; and
    mounting a boom counterbalance on the upper frame without protruding beyond the circumference.

10. The method of claim 9, wherein an offset distance is defined between the boom mounting position and the vertical axis, as measured perpendicular to the first side, and the boom is mounted to the upper frame so that the offset distance is approximately one-tenth of the diameter defined by the circumference.

11. The method of claim 9, further comprising the step of configuring the rear end of the upper frame to curve in a manner that coincides with the circumference.

12. The method of claim 11, further comprising the steps of forming a storage tank out of steel plates, and mounting the storage tank on the upper frame at a position as far rearward as possible without protruding beyond the circumference.

13. The method of claim 9, further comprising the steps of configuring the base assembly to have a width, as measured between the first side and the second side, and configuring the upper frame so that the diameter defined by the circumference is approximately twenty percent greater than the width.

14. The method of claim 9, further comprising the steps of configuring the base assembly to have a width of approximately eight and one-half feet, as measured between the first side and the second side, and configuring the upper frame so that the diameter defined by the circumference is approximately ten feet.

15. The method of claim 9, further comprising the step of configuring the upper frame so that the circumference is within one foot of the first side and within one foot of the second side and within one foot of the front end and within one foot of the rear end.

16. The method of claim 9, further comprising the step of configuring the cab to have an angled front wall that extends forward and upward from a lower end to an upper end.

17. The method of claim 9, further comprising the step of mounting a motor on the upper frame rearward of the cab and the boom.

18. The method of claim 9, further comprising the step of sizing and configuring the upper frame relative to the base so that a diameter of the circumference extending parallel to the first side of the upper frame is disposed entirely between a forwardmost portion of the base and a rearwardmost portion of the base.

19. A forest harvester, comprising:

a base having ground engaging treads;

an upper frame having a front end and a rear end, wherein the upper frame is approximately centered relative to the base and rotatably mounted on the base, and the upper frame rotates about a vertical axis relative to the base, and a radially outermost portion of the upper frame defines a maximum acceptable circumference;

a storage tank mounted on the upper frame at a rearwardmost and outermost position on the upper frame;

a boom movably mounted on the upper frame at a position within the circumference, radially displaced from the vertical axis, and relatively closer to one side of the upper frame; and a cab mounted on the upper frame between the boom and an opposite side of the upper frame, and as far forward as possible without interfering with the boom and without protruding beyond the circumference.

20. The forest harvester of claim 19, wherein the storage tank has a rearward wall which is curved to coincide with the circumference.

21. The forest harvester of claim 19, wherein the storage tank has steel plate walls which are more than one inch thick.

22. A forest harvester, comprising:

a base having ground engaging treads;

an upper frame having a front end and a rear end, wherein the upper frame is approximately centered relative to the base and rotates about a vertical axis relative to the base, and a radially outermost portion of the upper frame defines a maximum acceptable circumference;

a boom pivotally mounted on the upper frame at a position within the circumference, radially displaced from the vertical axis toward one side of the upper frame, wherein the boom pivots about a horizontal axis relative to the upper frame;

a cab mounted on the upper frame between the boom and an opposite side of the upper frame, and as far forward as possible without interfering with the boom and without protruding beyond the circumference; and a seat mounted within the cab, wherein the seat is intersected by a first vertical plane which contains the vertical axis and extends perpendicular to the one side of the upper frame, and the seat is forward of a second vertical plane which contains the horizontal axis and extends parallel to the first vertical plane.

* * * * *